F. C. WITT.
LINK CHAIN.
APPLICATION FILED JULY 8, 1918.

1,345,818.

Patented July 6, 1920.

Witnesses:-

Inventor:-
Frederick C. Witt.

UNITED STATES PATENT OFFICE.

FREDERICK C. WITT, OF ROANOKE, VIRGINIA.

LINK CHAIN.

1,345,818.  Specification of Letters Patent.  Patented July 6, 1920.

Application filed July 8, 1918. Serial No. 243,737.

*To all whom it may concern:*

Be it known that I, FREDERICK C. WITT, a citizen of the United States, residing at Roanoke, in the county of Roanoke, State of Virginia, have invented certain new and useful Improvements in Link Chains; and I do hereby declare the following to be a full, clear, and exact description of the invention, such as will enable others skilled in the art to which it appertains, to make and use the same.

This invention is an improvement in power transmission chains and has particular reference to the link construction therefor.

In known constructions, chain links have been provided wherein the inner and outer side bars thereof have been assembled by employing pins or rivets which form bearings for the ends of the outer side bars, the pins or rivets being surrounded by thimbles or cross bars the ends of which terminate short of the inner faces of the outer side bars and form bearings for the ends of the inner side bars.

It is proposed, in the present invention, to provide a link structure wherein the thimble or cross bar, in contradistinction to known structures, is made of sufficient length to permit the ends thereof to extend through the ends of the inner side bars and project into recesses formed in the inner faces of the outer side bars in which recesses, the thimble has an independent rotary movement.

An object of the invention is to provide an improved chain of this character wherein the working strength and durability is increased and the liability of fracture to the parts thereof is decreased.

Another object is the provision of an improved chain link construction in which lateral and longitudinal movements of the joints or connections are reduced to a minimum and wherein the thimbles of the links will have an independent rotary movement about the rivets.

A further object is the provision of a chain which is simple in construction, easy to manufacture and effective in carrying out the purposes for which it is designed.

The inventive idea involved is capable of receiving a variety of mechanical expressions one of which, for the purpose of illustrating the invention, is shown in the accompanying drawing wherein:—

Figures 1, 2, 3:
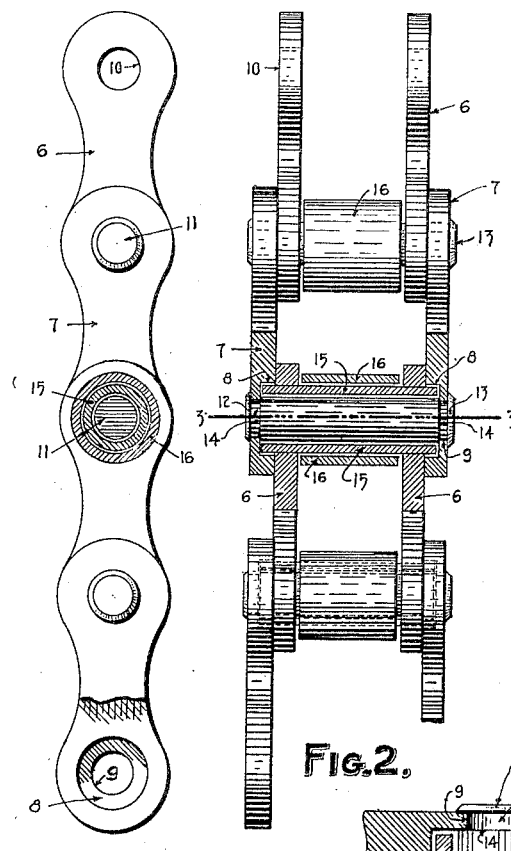
Figure 1 is a side elevation of the chain partly in longitudinal section.
Fig. 2 is a top plan view partly in horizontal section.
Fig. 3 is an enlarged transverse section on the line 3—3 of Fig. 2.

The chain is illustrated in what is now believed to be a preferred form of the invention and is primarily designed for use on automobiles, trucks, motorcycles, but it will of course be understood that the same is applicable for use in the transmission of power, the conveyance of material and, in fact, in connection with all chain driven machinery.

The chain preferably comprises the opposed inner and outer side bars 6 and 7, respectively, adjacent ends of said inner and outer bars being arranged in overlapping relation. Each overlapping end of each of the outer side bars 7 is provided in the inner face thereof with a recess 8 having a depth of approximately one-half the thickness of the side bar and provided in the bottom and centrally thereof with an opening 9 which extends through the side bar for a purpose which will presently appear. The adjacent end of each of the inner side bars 6 is provided with an opening 10 which alines with the recess 8 but is of a diameter slightly less than said recess.

A rivet or pin 11 is preferably employed to join the opposed overlapping ends of the side bars 6 and 7 and the major portion of said rivet is of a diameter considerably less than that of the recesses 8 but larger than that of the openings 9. The ends of each rivet or pin 11 are reduced to provide the extensions 12 which project through the openings 9 in the outer side bars and are provided with heads 13 whereby to prevent relative lateral movement between the rivet and side bars. The extensions 12 form annular shoulders 14 at the ends of the rivet or pin 11 and the distance between said shoulders is the same as that between the bottoms of the opposed recesses 8 so that the shoulders will engage the said bottoms and further aid in preventing any lateral movement of the parts.

A cylindrical thimble 15 is employed in connection with each of the rivets 11 and in mounting the thimble in position the same is subjected to a driven or otherwise close fit in the openings 10 of the inner side bars 6 and the thimble is of such a length that the ends thereof will extend through said openings 10 and beyond the outer faces of the inner side bars. The internal diameter of the thimble is slightly greater than that of the rivet or pin 11 and the external diameter thereof is slightly less than that of the recesses 8 so that the projecting ends of said thimble will be spaced slightly from the walls of said recess. The length of the thimble is less than the distance between the bottoms of the recesses 8 or, in other words, less than the length of the major portion of the rivet or pin 11 but, as will be apparent from the drawing, the thimble is of sufficient length to permit of the projecting ends thereof extending into the recesses 8 wherein the thimble will have an independent rotary movement. Disposed between the inner faces of the inner side bars 6 in spaced relation thereto and surrounding the intermediate portions of the thimble 15 is a freely rotatable roller 16. From the foregoing description taken in connection with the accompanying drawing it will be apparent that the rivet 11 will be fixed to the outer side bars 7 and therefore stationary within the recesses 8 while the thimble 15 will be fixed to the inner side bars 6 and free to rotate within said recesses whereby the several links of the chain will have relative movements with respect to each other and whereby the wear upon the several parts due to such relative movement between the links will be reduced to a minimum.

What is claimed is:—

1. A chain comprising inner and outer side bars having overlapping ends, the ends of the inner bars having openings therethrough and the ends of the outer bars having recesses in their inner faces opposite to and larger than said openings and also having openings extending from the bottoms of said recesses through these bars, rivets whereof each has reduced extensions at its extremities passing through the openings in the outer bars and headed and shoulders around said extensions contacting with the bottoms of said recesses, and thimbles fixed to and passing through the openings in the inner side bars and inclosing the major portion of said rivets, their ends extending into said recesses and held out of contact with the walls or the bottoms of such recesses, as described.

2. A chain comprising inner and outer side bars having overlapping ends, the ends of the inner bars having circular openings therethrough and the ends of the outer bars having circular recesses in their inner faces opposite to and circumferentially larger than said openings and also having openings coaxial with and extending from the bottoms of said recesses, rivets whereof each has its major portion cylindrical, reduced extensions at its extremities passing through the openings in the outer bars and headed and shoulders around said extensions contacting with the bottoms of said recesses, and cylindrical thimbles fixed to and passing through the openings in the inner side bars and revolubly inclosing the major portion of said rivets, their ends extending into said recesses and held out of contact with the walls or the bottoms of such recesses, as described.

3. A chain comprising inner and outer side bars having their ends in overlapping relation, the outer side bars being provided with recesses in their inner faces and openings communicating with said recesses, rivets extending through the overlapping ends of said side bars and fixed in the openings in said outer side bars, shoulders on the rivets spacing these bars, and a thimble surrounding each rivet and fixed in the inner side bars and having its ends projecting into the recesses of the adjacent outer side bars and spaced from the walls and bottoms of said recesses.

4. A chain comprising inner and outer side bars having their ends in overlapping relation, the outer side bars being provided with recesses in their inner faces and openings communicating with said recesses, rivets extending through the inner side bars in spaced relation thereto and projecting into said recesses in spaced relation to the walls thereof, the ends of said rivets having reduced extensions to form shoulders engageable with the bottoms of said recesses, said extensions being fixed in the openings in the outer side bars, and a thimble surrounding each rivet and fixed in the inner side bars and having projecting ends extending into said recesses in spaced relation to the walls and bottoms thereof and surrounding the portions of said rivet which project into said recesses.

In testimony whereof, I affix my signature, in the presence of two witnesses.

FREDERICK C. WITT.

Witnesses:
F. W. GRAY,
E. M. ABBOTT.